US009655439B1

(12) United States Patent
Liu

(10) Patent No.: US 9,655,439 B1
(45) Date of Patent: May 23, 2017

(54) SUPPORTING RACK

(71) Applicant: CHEN-SOURCE INC., Taoyuan (TW)

(72) Inventor: Chang-Li Liu, Taoyuan (TW)

(73) Assignee: CHEN-SOURCE INC., Taoyuan (TW)

( * ) Notice: Subject to any disclaimer, the term of this patent is extended or adjusted under 35 U.S.C. 154(b) by 0 days.

(21) Appl. No.: 15/064,234

(22) Filed: Mar. 8, 2016

(51) Int. Cl.
A47B 21/03 (2006.01)
A47B 21/06 (2006.01)
H02G 3/08 (2006.01)
G06F 1/16 (2006.01)

(52) U.S. Cl.
CPC .......... A47B 21/0314 (2013.01); A47B 21/06 (2013.01); G06F 1/16 (2013.01); H02G 3/083 (2013.01); A47B 2021/066 (2013.01)

(58) Field of Classification Search
CPC .......... A47B 21/03; A47B 21/06; H02G 3/08; G06F 1/16
USPC .......................................... 174/541
See application file for complete search history.

(56) References Cited

U.S. PATENT DOCUMENTS 6,036,288 A * 3/2000 Shih .................. A47B 21/0314
248/918
D564,529 S * 3/2008 Hughes ........................ D14/451
2011/0267773 A1* 11/2011 Macfarlane ........... G06F 1/1632
361/679.55

FOREIGN PATENT DOCUMENTS

CN 202421962 * 9/2012
CN 202421962 U * 9/2012

* cited by examiner

Primary Examiner — Timothy Thompson
Assistant Examiner — Charles Pizzuto
(74) Attorney, Agent, or Firm — Muncy, Geissler, Olds & Lowe, P.C.

(57) ABSTRACT

A supporting rack includes two one-piece supporting foot members each including an upright base panel and a bearing panel perpendicularly extended from the top side of the upright base panel, a clamping panel outwardly extended from the bottom side of the upright base panel of one one-piece supporting foot member for holding a mobile electronic device, a tabletop mounted on the bearing panels of the two one-piece supporting foot members in a replaceable manner and defining with the two one-piece supporting foot members an accommodation chamber for accommodating computer peripheral apparatuses, and an electronic expansion box detachably mounted at the upright base panel of one one-piece supporting foot member within the accommodation chamber for connecting multiple computer peripheral apparatuses to a computer or server.

6 Claims, 7 Drawing Sheets

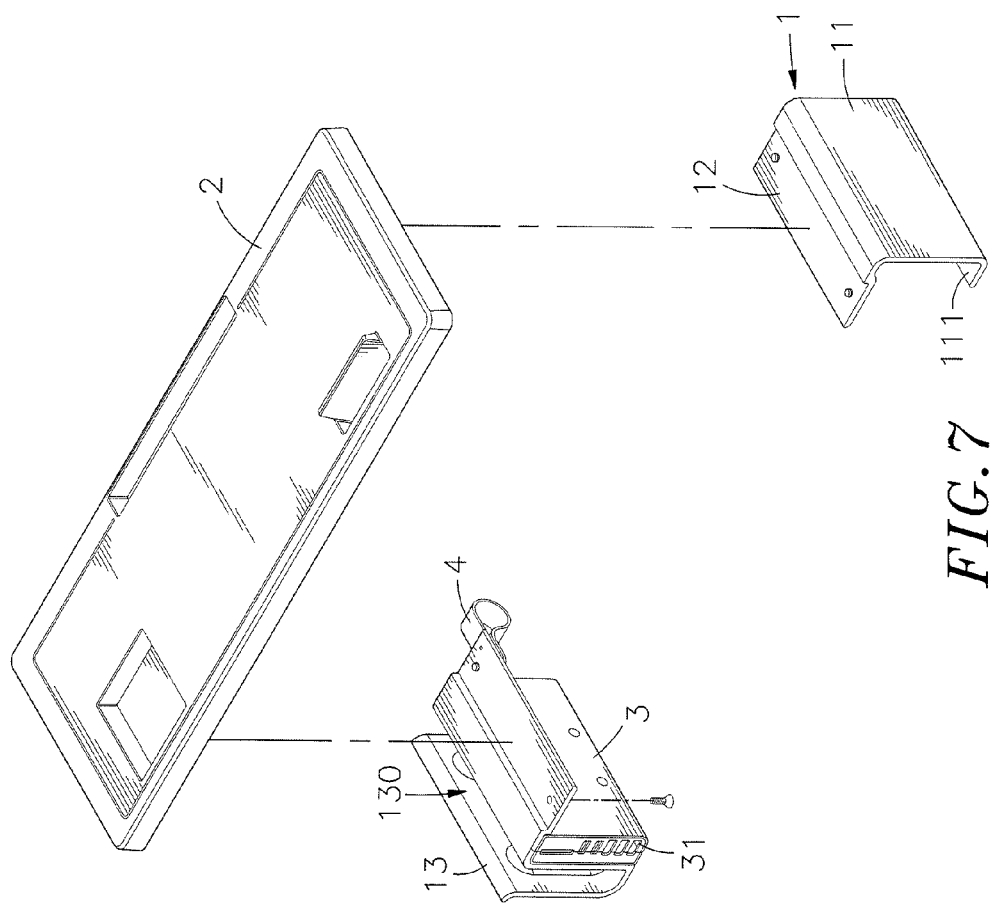

SUPPORTING RACK

BACKGROUND OF THE INVENTION

1. Field of the Invention

The present invention relates to a device supporting racks and more particularly to such a supporting rack, which comprises two supporting foot member, a tabletop mounted on the supporting foot members in a replaceable manner, and an electronic expansion box detachably mounted at one supporting foot member beneath the tabletop for easy maintenance and replacement.

2. Description of the Related Art

With fast development of electronic and multimedia technologies, advanced and sophisticated computer, notebook computer and many other mobile electronic devices have been continuously created and widely used around every corner in our society. Due to the popularization of computers, most people are dependent on computers. Nowadays, people often use a keyboard, mouse and other computer peripheral equipment to provide electrical signals to a computer, enabling the computer to output the content of the electrical signals through a display screen or printer. A display screen is a requisite output device of a computer.

Further, in order to allow the user to watch the display screen at a comfortable angle, a screen rack is generally used to support the display screen, allowing the user to adjust the viewing angle of the display screen according to personal preference.

However, when using a computer system, people generally will position the display screen of the computer system on a desk. When using a screen rack to support the display screen on the desk, the screen rack will occupy much desktop space. In order to save desktop space, a suspension support device may be used to suspend the display screen above the desktop. However, a suspension support device has the drawbacks of installation difficulty and adjustment inconvenience.

There are supporting racks commercially available. These supporting racks can be mounted on a desktop to support a display screen above the desktop with a space defined therein for accommodating keyboard, mouse or other computer peripheral apparatus, saving much the desktop space. These supporting racks may be equipped with computer expansion jacks for the connection of computer peripheral apparatuses. However, these conventional supporting racks are monotonous, not allow the user to change the design of the outer appearance according to personal preference, making them less attractive to consumers.

Therefore, it is desirable to provide a supporting rack that eliminates the aforesaid drawbacks.

SUMMARY OF THE INVENTION

The present invention has been accomplished under the circumstances in view. It is the main object of the present invention to provide a supporting rack, which comprises two supporting foot members, a tabletop and an electronic expansion box. The supporting foot members are one-piece members, each comprising an upright base panel, and a bearing panel perpendicularly extended from a top end of the upright base panel. The tabletop is detachably mounted on the bearing panels of the two supporting foot members and defining with the two supporting foot members an accommodation chamber for accommodating computer peripheral apparatuses, and an electronic expansion box detachably mounted at the upright base panel of one supporting foot member within the accommodation chamber for connecting multiple computer peripheral apparatuses to a computer or server. Thus, the user can selectively use any of various designs of tabletops for a replacement according to personal need or preference, enhancing the sense of beauty and widening the product applicability.

According to a second aspect of the present invention, one of the supporting foot members further comprises a clamping panel outwardly extended from an opposing bottom end of the upright base panel remote from the bearing panel and defining with the upright base pane a clamping space. The user can mount an electronic device in the clamping space, saving tabletop space. This arrangement allows people sitting at one lateral side to watch the content displayed on the screen of the electronic device that is held in the clamping space, enhancing the practicability of the supporting rack.

According to a third aspect of the present invention, the electronic expansion box is attached to the inner side of the upright base panel of one supporting foot member within the accommodation chamber. If the electronic expansion box fails or is damaged, the user can remove the electronic expansion box from the supporting foot member for repairmen or replacement without changing the original structure or appearance of the supporting foot member. Because the electronic expansion box is detachably mounted at the inner side of one supporting foot member, the user can install a different function of electronic expansion box for a replacement, enhancing the applicability and convenience of use of the supporting rack.

According to a fourth aspect of the present invention, the electronic expansion box is adapted for data transmission between multiple computer peripheral apparatuses and a computer or server. If the computer or server is placed on the floor and the supporting rack is placed on a desk, the user can connect the cables of the computer peripheral apparatuses to the electronic expansion box in the supporting rack conveniently, without needing to bend the body and then to connect the cables to the computer or server that is placed on the floor, enhancing the convenience of application, widening the applicability of the product and attracting consumers to buy, and providing better expansibility in line with market demand.

According to a fifth aspect of the present invention, the supporting rack further comprises a cable wire holder fastened to the bottom surface of the bearing panel of the supporting foot member adjacent to the electronic expansion box for neatly gathering up the cables and or electrical wires of the installed peripheral apparatuses, not only to beautify the desktop, but also can enhance the efficiency of the use of desktop space.

Other advantages and features of the present invention will be fully understood by reference to the following specification in conjunction with the accompanying drawings, in which like reference signs denote like components of structure.

BRIEF DESCRIPTION OF THE DRAWINGS

FIG. 7 is an exploded view of an alternate form of the supporting rack in accordance with the present invention.

Figure 1:
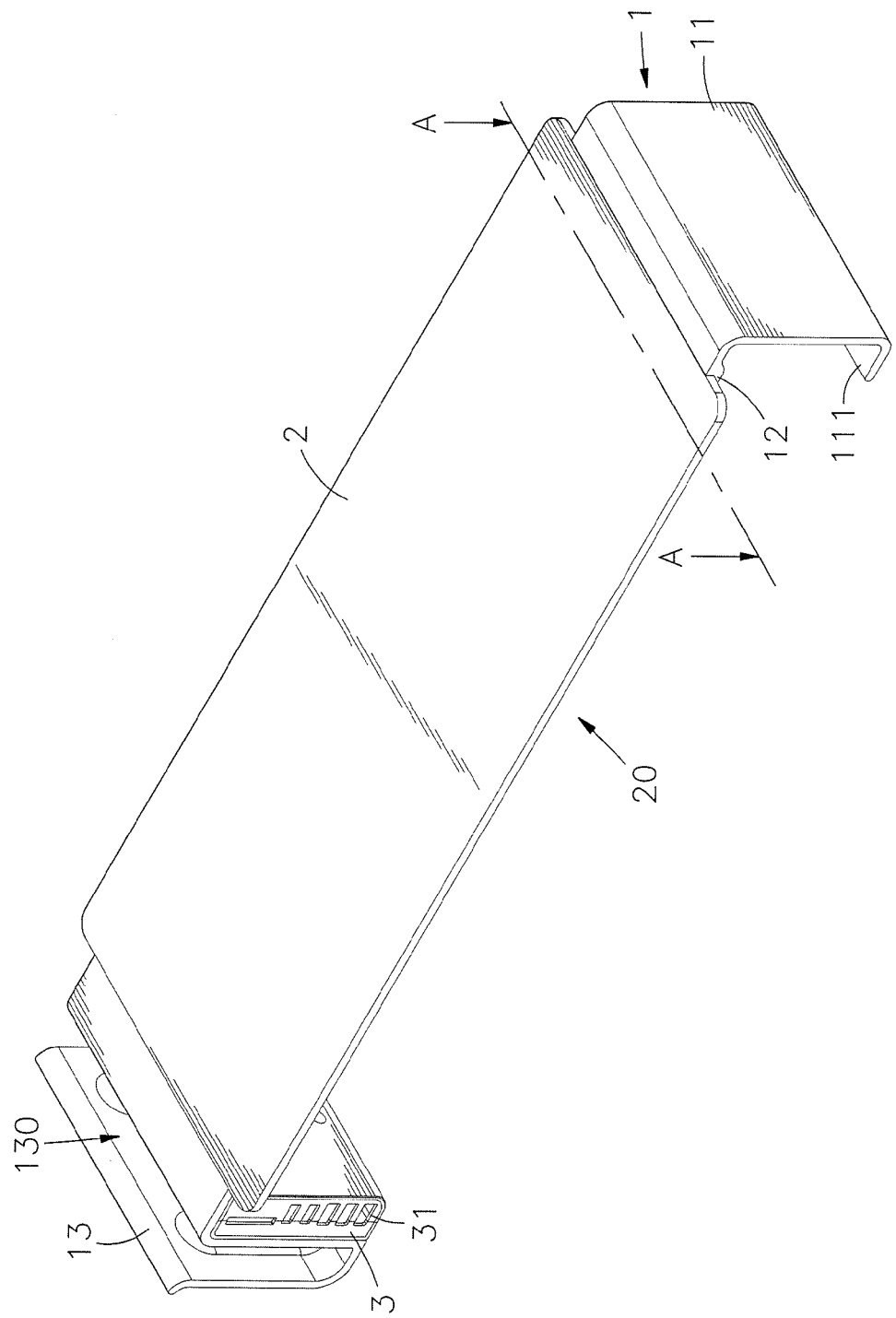
FIG. 1 is an oblique top elevational view of a supporting rack in accordance with the present invention.
Figure 2:
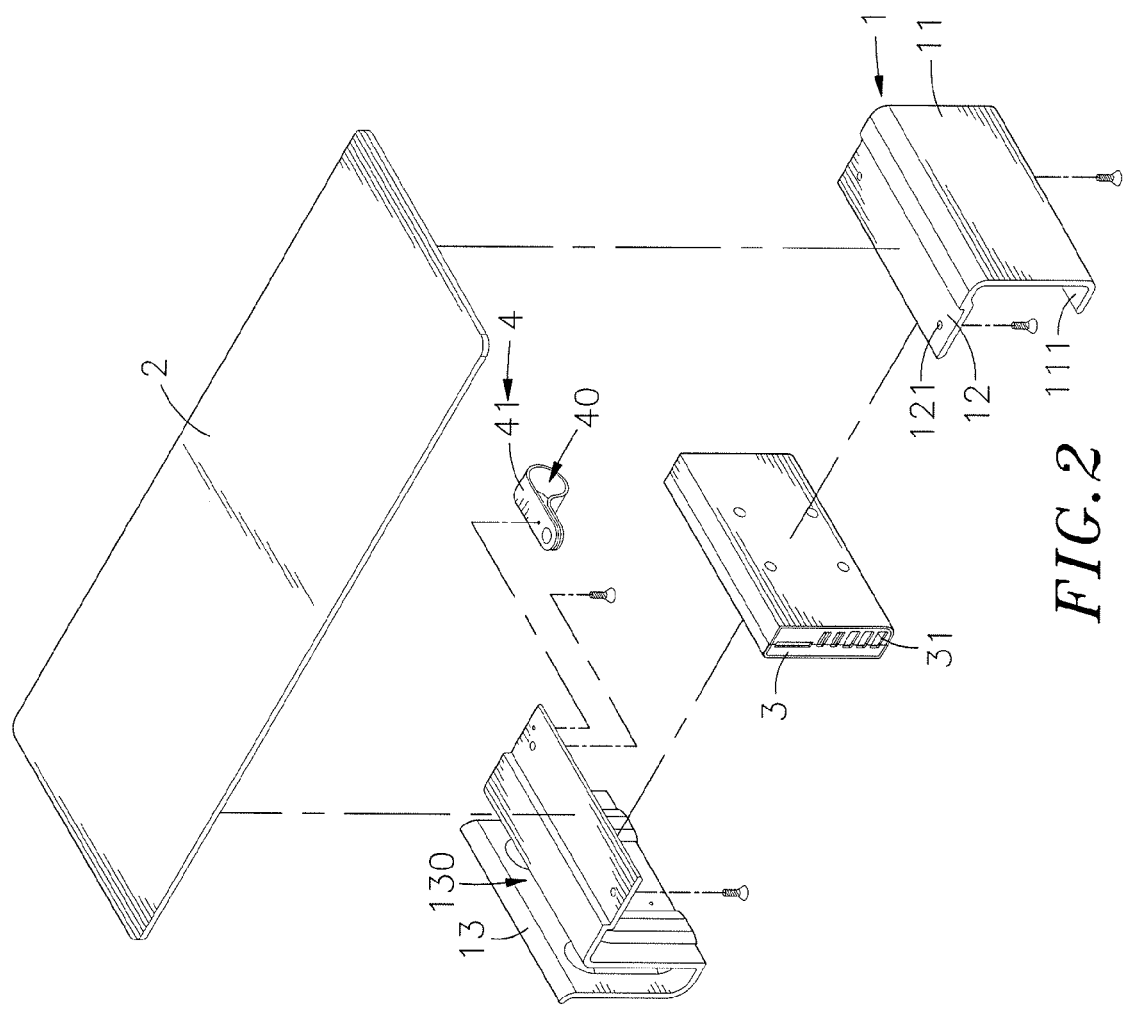
FIG. 2 is an exploded view of the supporting rack in accordance with the present invention.
Figure 3:
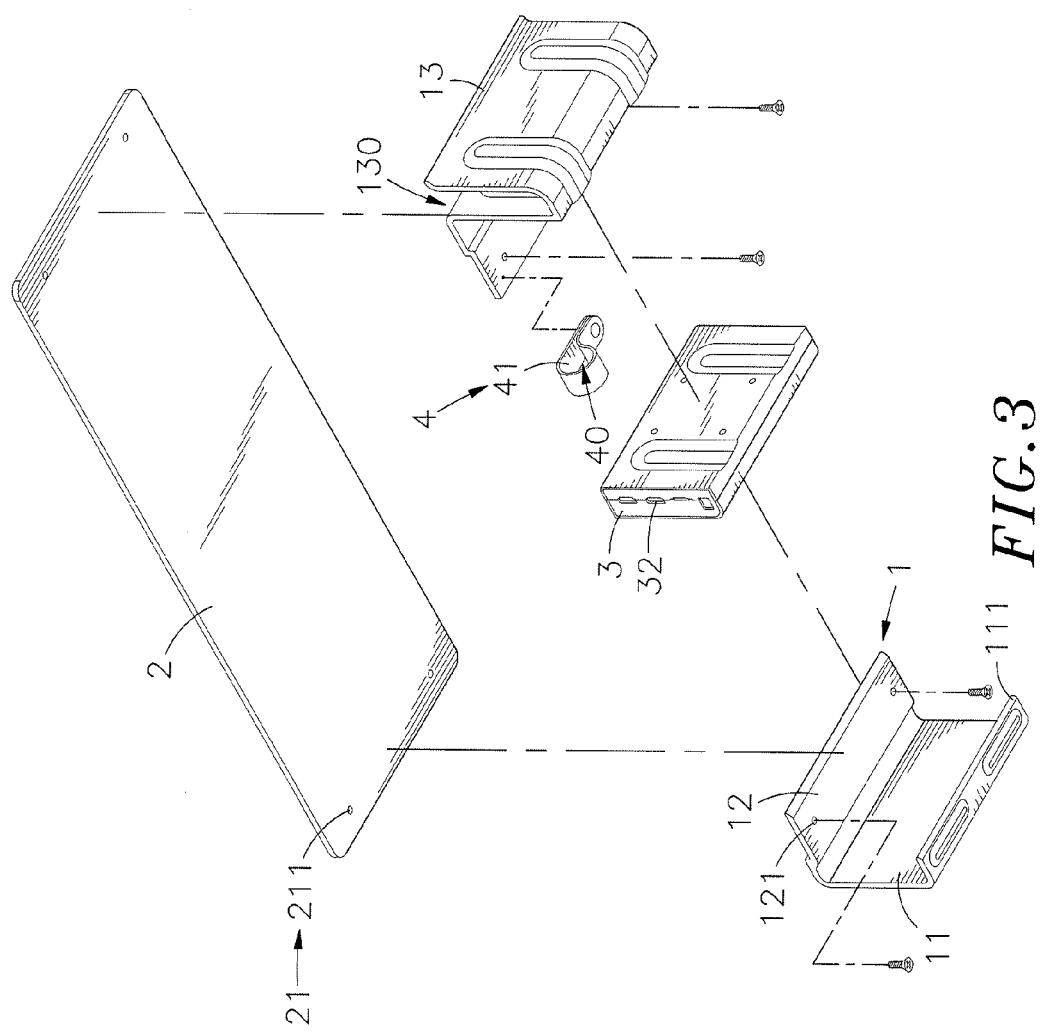
FIG. 3 corresponds to FIG. 2 when viewed from another angle.
Figure 4:
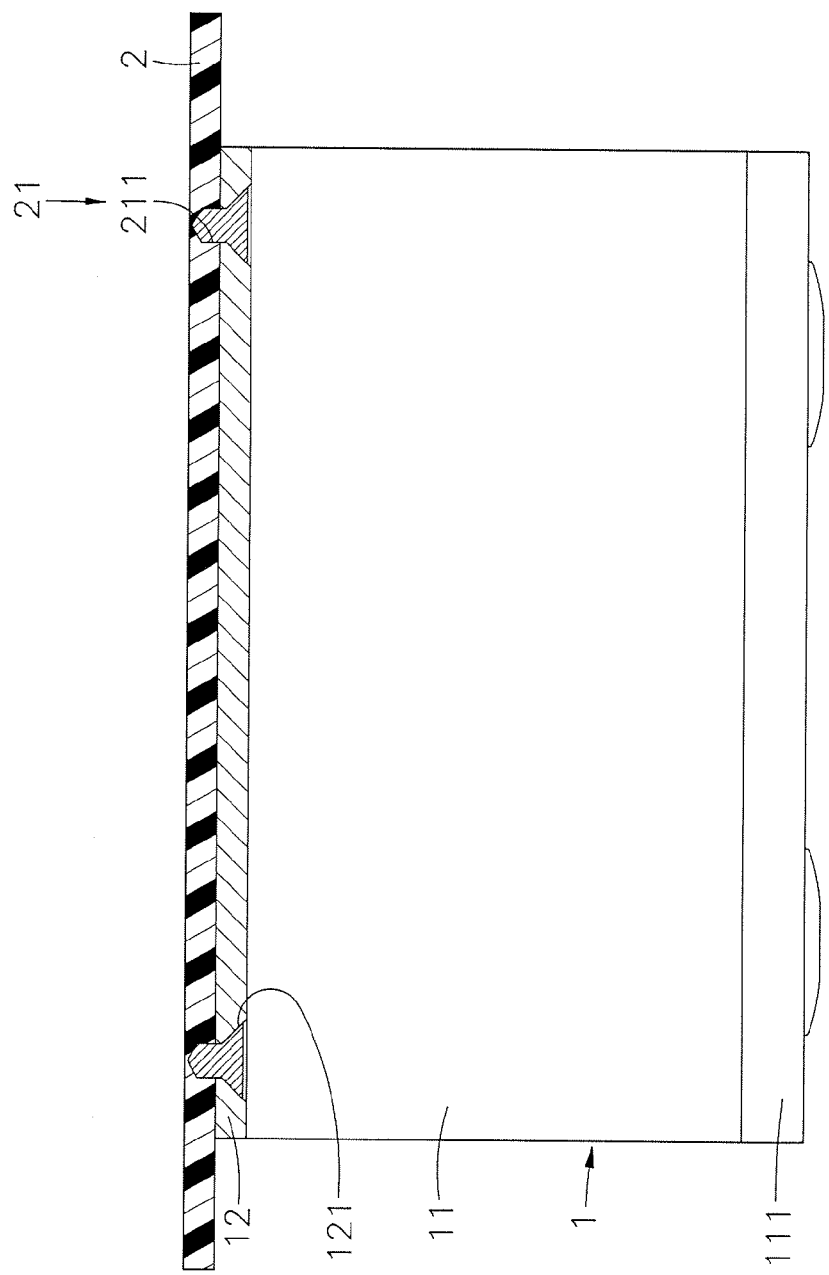
FIG. 4 is a sectional view taken in an enlarged scale along line A-A of FIG. 1
Figure 5:
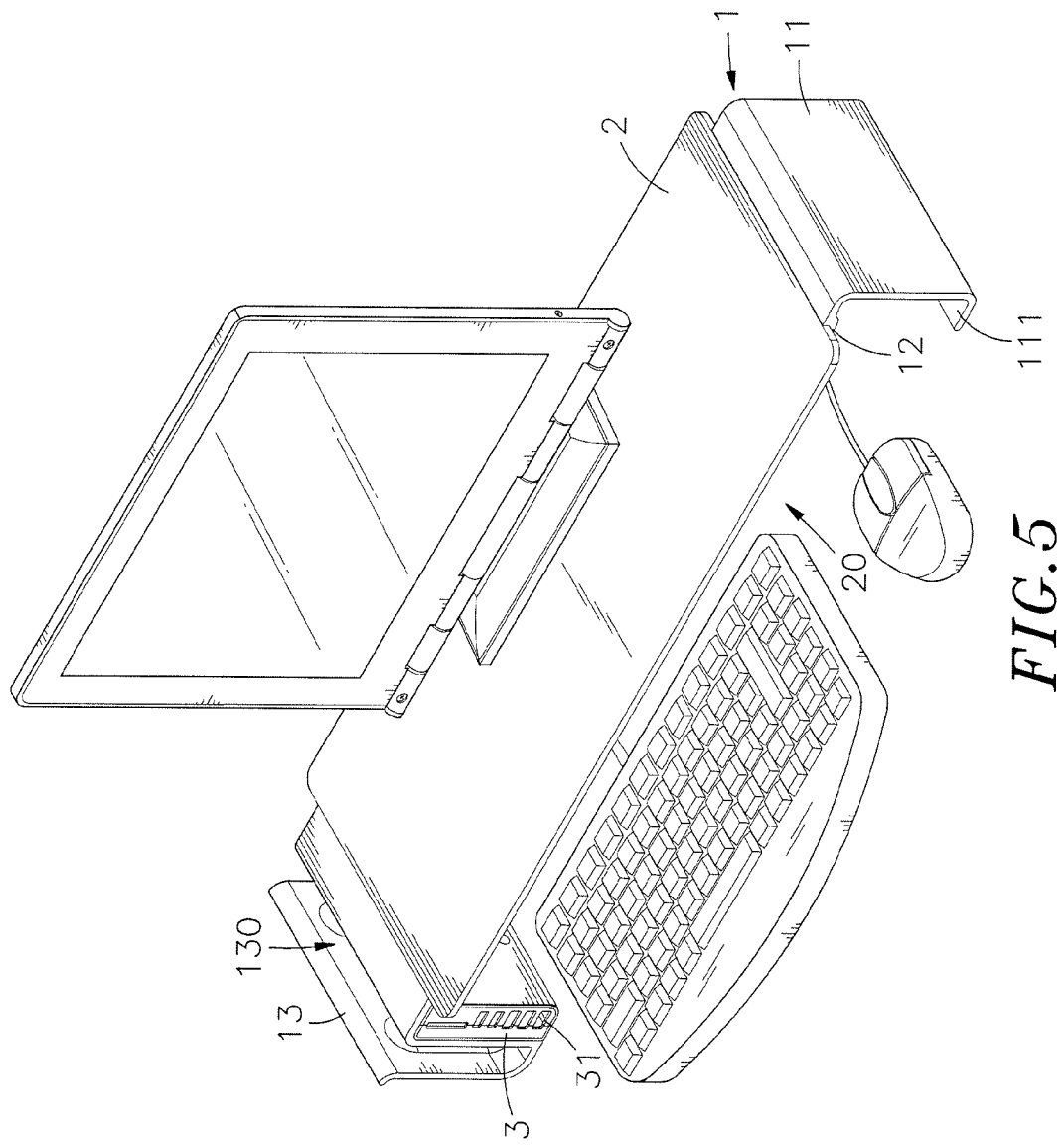
FIG. 5 illustrates an application example of the supporting rack in accordance with the present invention.

DETAILED DESCRIPTION OF THE
PREFERRED EMBODIMENT

Referring to FIGS. 1-5, a supporting rack in accordance with the present invention is shown. The supporting rack comprises two supporting foot members 1, a tabletop 2 and an electronic expansion box 3.

The supporting foot members 1 are one-piece members, each comprising an upright base panel 11, a bearing panel 12 perpendicularly extended from a top end of the upright base panel 11, and a plurality of mounting through holes 121 cut through opposing top and bottom surfaces of the bearing panel 12. One of the two supporting foot members 1 further comprises a clamping panel 13 outwardly extended from an opposing bottom end of the upright base panel 11 remote from the bearing panel 12 and defining with the associating upright base panel 11 a clamping space 130. The other supporting foot member 1 further comprises a foot panel 111 perpendicularly and inwardly extended from an opposing bottom end of the upright base panel 11 remote from and in a parallel relationship with the bearing panel 12.

The tabletop 2 comprises two mounting portion 21 respectively disposed at two opposite ends thereof, and a plurality of recessed mounting holes 211 located at a bottom side of the each mounting portion 21. Preferably, the tabletop 2 is a plate member made from a plastic material, however, in actual application, wood, glass, or any other material with load supporting ability can be selectively used for making the tabletop 2.

The electronic expansion box 3 comprises a plurality of jacks 31 located at a front side thereof, and a plurality of mating connection ports 32 located opposing rear side thereof and respectively electrically coupled to the jacks 31. The jacks 31 of the electronic expansion box 3 can be, but not limited to, USB jacks, speaker jacks, earphone jacks, microphone jacks, memory card jacks, or chip card jacks. In this embodiment, the jacks 31 of the electronic expansion box 3 are USB jacks. In this embodiment, the jacks 31 of the electronic expansion box 3 are USB jacks.

Figure 6:
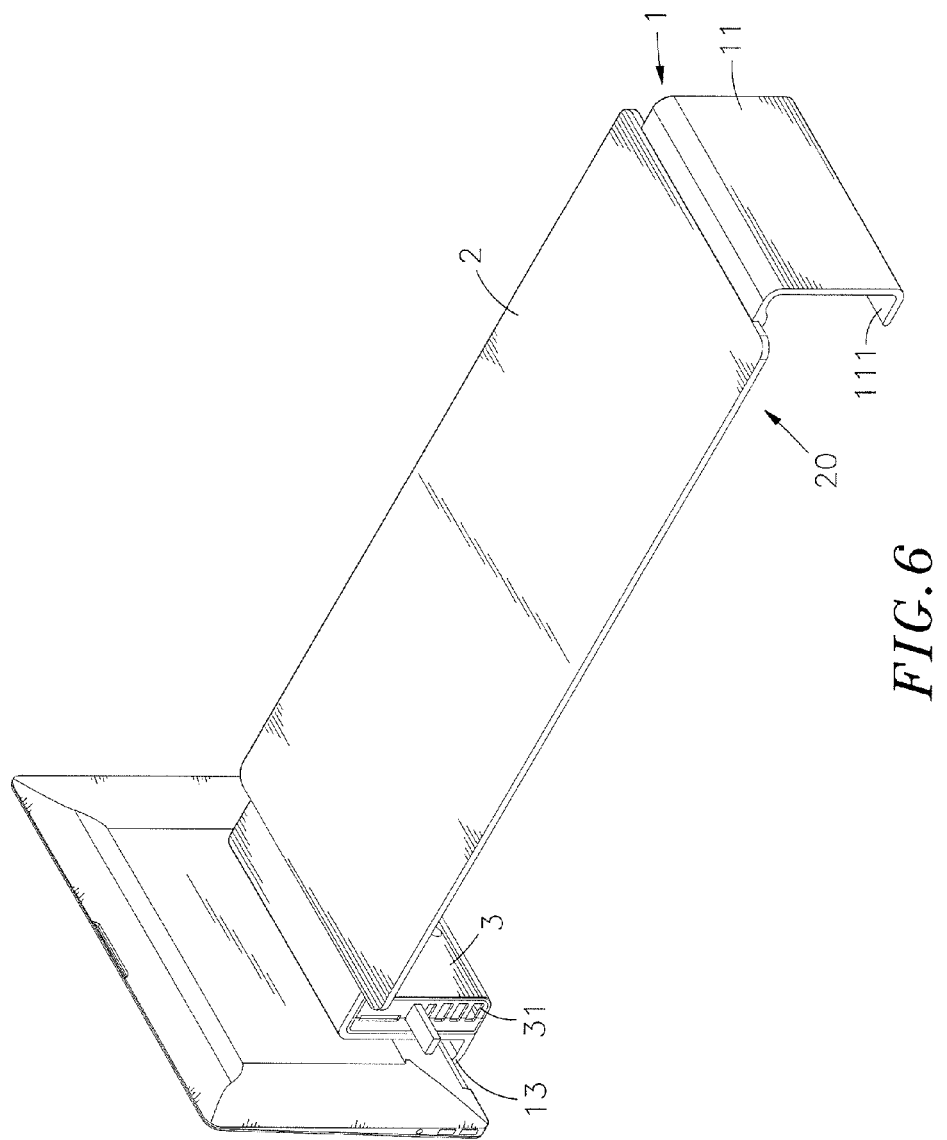
FIG. 6 illustrates another application example of the supporting rack in accordance with the present invention.

Referring to FIG. 6 and FIGS. 4 and 5 again, in installation, place the tabletop 2 on the bearing panels 12 of the two supporting foot members 1 to keep the mounting through holes 121 at the bearing panels 12 of the supporting foot members 1 in vertical alignment with the respective recessed mounting holes 211 at the mounting portions 21 of the tabletop 2, and then use a hand tool to drive respective screws through the mounting through holes 121 at the bearing panels 12 into the respective recessed mounting holes 211 at the mounting portions 21. After affixed the tabletop 2 to the two supporting foot members 1, an accommodation chamber 20 is defined by the tabletop 2 and the two supporting foot members 1. At this time, the user can insert the electronic expansion box 3 into the inside the accommodation chamber 20, and then attach to the electronic expansion box 3 to an inner side of the upright base panel 11 of one supporting foot member 1 (for example, attached to the inner side of the upright base panel 11 of the supporting foot member 1 that comprises the clamping panel 13.

When going to detach the tabletop 2 from the two supporting foot members 1, use a hand tool to remove the screws from the recessed mounting holes 211 at the mounting portions 21 of the tabletop 2, allowing removal of the tabletop 2 from the two supporting foot members 1 for a replacement.

Except the method of fastening the tabletop 2 to the two supporting foot members 1 with screws, riveting joint, tenon and mortise joint, or any other equivalent fastening technique can be employed to affix the tabletop 2 to the two supporting foot members 1.

In one application example of the present invention, position a computer monitor is on the top surface of the tabletop 2, and then use transmission cables to electrically connect the mating connection ports 32 of the electronic expansion box 3 to a computer or server (not shown), and then electrically connect the cables of peripheral apparatuses (such as USB memory sticks, speakers, keyboard, computer mouse, etc.) to the jacks 31 of the electronic expansion box 3 for communication between the computer/server and the peripheral apparatuses. Further, when not in use, the keyboard, computer mouse or other peripheral apparatuses can be received in the accommodation chamber 20, saving tabletop space.

The supporting rack of the invention further comprises a cable wire holder 4 fastened to the bottom surface of the bearing panel 12 of the supporting foot member 1 adjacent to the electronic expansion box 3. The cable wire holder 4 comprises a narrow, long, resilient sheet member 41, a snap fastener consisting of male fastener element and a female fastener element respectively located at two opposite ends of the narrow, long, resilient sheet member 41 for securing the two opposite ends of the narrow, long, resilient sheet member 41 together to form a loop with a retaining space 40 defined therein for neatly gathering up the cables and or electrical wires of the installed peripheral apparatuses, not only to beautify the desktop, but also can enhance the efficiency of the use of desktop space.

Referring to FIG. 7, an alternate form of the supporting rack of the present invention is shown. As illustrated, a different design of the tabletop 2 is used as a substitute. The user can use a hand tool to remove the screws from the recessed mounting holes 211 at the mounting portions 21, and then remove the tabletop 2 from the two supporting foot members 1 for a replacement of a different design of the tabletop 2. Thus, the user can conveniently change the design of the tabletop 2 according to personal preference.

As described above, the bearing panels 12 of the two supporting foot members 1 are configured for the mounting of the mounting portions 21 of the tabletop 2 in a detachable manner, and therefore, the user can conveniently change the design of the tabletop 2 according to personal preference, thereby enhancing the sense of beauty, widening the product applicability and attracting consumers to buy.

Further, as described above, one supporting foot member 1 has the clamping panel 13 outwardly extended from an opposing bottom end of the upright base panel 11 remote from the bearing panel 12 and defining with the associating upright base panel 11 the clamping space 130. The user can mount an electronic device (such as tablet computer) in the clamping space 130, saving tabletop space. This arrangement allows people sitting at one lateral side to watch the content displayed on the screen of the electronic device that is held in the clamping space 130, enhancing the practicability of the supporting rack.

Further, as described above, the electronic expansion box 3 is attached to the inner side of the upright base panel 11 of the one supporting foot member 1 within the accommodation chamber 20. If the electronic expansion box 3 fails or is damaged, the user can remove the electronic expansion box 3 from the supporting foot member 1 for repairmen or replacement without changing the original structure or appearance of the supporting foot member 1. Because the electronic expansion box 3 is detachably mounted at the inner side of the one supporting foot member 1, the user can install a different function of the electronic expansion box 3 for a replacement, enhancing the applicability and convenience of use of the supporting rack.

Further, the electronic expansion box 3 is adapted for data transmission between multiple computer peripheral apparatuses and a computer or server. If the computer or server is placed on the floor and the supporting rack is placed on a desk, the user can connect the cables of the computer peripheral apparatuses to the electronic expansion box 3 in the supporting rack conveniently, without needing to bend the body and then to connect the cables to the computer or server that is placed on the floor, enhancing the convenience of application, widening the applicability of the product and attracting consumers to buy, and providing better expansibility in line with market demand.

In conclusion, the invention provides a supporting rack, which comprises two supporting foot members 1, a tabletop 2 detachably mounted on the supporting foot members 1, and an accommodation chamber 20 defined between the two supporting foot members 1 beneath the tabletop 2 for accommodating keyboard, computer mouse and other computer peripheral apparatuses, saving tabletop space. The detachable mounting arrangement between the supporting foot member 1 and the tabletop 2 allows the user to replace a different design of the tabletop 2 conveniently, enhancing the sense of beauty, widening the applicability of the product.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A supporting rack, comprising:
a one-piece first supporting foot member comprising a first upright base panel, a first bearing panel perpendicularly extended from a top end of said first upright base panel, and a clamping panel perpendicularly and outwardly extended from an opposing bottom end of said first upright base panel remote from said first bearing panel and defining with said first upright base panel a clamping space;
a one-piece second supporting foot member comprising a second upright base panel, a second bearing panel perpendicularly extended from a top end of said second upright base panel, and a plurality of mounting through holes cut through opposing top and bottom surfaces of said second bearing panel;
a tabletop comprising two mounting portions respectively located at two opposite ends thereof and respectively fastened to said first bearing panel of said one-piece first supporting foot member and said second bearing panel of said one-piece second supporting foot member, said tabletop defining with said one-piece first supporting foot member and said one-piece second supporting foot member an accommodation chamber; and
an electronic expansion box accommodated in said accommodation chamber and selectively attached to an inner surface of said first upright base panel of said one-piece first supporting foot member or an inner surface of said second upright base panel of said one-piece second supporting foot member.

2. The supporting rack as claimed in claim 1, wherein said one-piece second supporting foot member further comprises a foot panel perpendicularly and inwardly extended from an opposing bottom end of said second upright base panel remote from and in a parallel relationship with said second bearing panel.

3. The supporting rack as claimed in claim 1, wherein said one-piece first supporting foot member further comprises a plurality of said mounting through holes cut through opposing top and bottom surfaces of said first bearing panel; said one-piece second supporting foot member further comprises a plurality of said mounting through holes cut through opposing top and bottom surfaces of said second bearing panel; said tabletop comprises a plurality of recessed mounting holes respectively located at a bottom side of each said mounting portion and respectively fastened to said mounting through holes of said mounting portion of said one-piece first supporting foot member and said one-piece second supporting foot member.

4. The supporting rack as claimed in claim 1, wherein said electronic expansion box comprises a plurality of jacks located at a front side thereof, and a plurality of mating connection ports located at an opposing rear side thereof and respectively electrically coupled to said jacks.

5. The supporting rack as claimed in claim 4, further comprising a cable wire holder mounted at a bottom surface of said first bearing panel of said one-piece first supporting foot member adjacent to said mating connection ports of said electronic expansion box.

6. The supporting rack as claimed in claim 5, wherein said cable wire holder comprises a narrow, long, resilient sheet member, said narrow, long, resilient sheet member having two opposite ends thereof detachably fastenable together, and a retaining space defined by said narrow, long, resilient sheet member when the two opposite ends of said narrow, long, resilient sheet member are fastened together.

* * * * *